United States Patent
Baird et al.

(10) Patent No.: US 9,068,126 B2
(45) Date of Patent: *Jun. 30, 2015

(54) METHODS FOR DEOXYGENATING BIOMASS-DERIVED PYROLYSIS OIL

(75) Inventors: Lance Awender Baird, Prospect Heights, IL (US); Timothy A. Brandvold, Arlington Heights, IL (US); Francis Stephen Lupton, Evanston, IL (US)

(73) Assignee: UOP LLC, Des Plaines, IL (US)

(*) Notice: Subject to any disclaimer, the term of this patent is extended or adjusted under 35 U.S.C. 154(b) by 828 days.

This patent is subject to a terminal disclaimer.

(21) Appl. No.: 13/326,050

(22) Filed: Dec. 14, 2011

(65) Prior Publication Data

US 2013/0152454 A1 Jun. 20, 2013

(51) Int. Cl.
 *C07C 1/00* (2006.01)
 *C10G 3/00* (2006.01)

(52) U.S. Cl.
 CPC .. *C10G 3/42* (2013.01); *C10G 3/45* (2013.01); *Y02E 50/10* (2013.01); *Y02E 50/14* (2013.01); *C10G 3/50* (2013.01); *C10G 2300/1011* (2013.01); *C10G 2300/4006* (2013.01); *C10G 2300/4081* (2013.01)

(58) Field of Classification Search
 CPC .......... C10G 3/40; C10G 45/00; C10G 49/00; C10G 2300/1011; C10G 2300/1048; Y02E 50/10; Y02E 50/14
 USPC ......... 585/240, 242; 44/605, 606; 201/21, 28, 201/29
 See application file for complete search history.

(56) References Cited

U.S. PATENT DOCUMENTS

| | | | |
|---|---|---|---|
| 5,091,499 A | 2/1992 | Chum et al. | |
| 6,143,856 A | 11/2000 | Roy et al. | |
| 8,119,847 B2 | 2/2012 | Dindi et al. | |
| 8,212,094 B2 | 7/2012 | Myllyoja et al. | |
| 8,217,210 B2* | 7/2012 | Agrawal et al. | 585/240 |
| 8,853,475 B2* | 10/2014 | Kalnes | 585/240 |
| 2008/0308457 A1 | 12/2008 | Dindi et al. | |
| 2009/0082604 A1* | 3/2009 | Agrawal et al. | 585/242 |
| 2009/0253948 A1 | 10/2009 | McCall et al. | |
| 2009/0259082 A1* | 10/2009 | Deluga et al. | 585/14 |
| 2010/0140136 A1* | 6/2010 | Spilker et al. | 208/57 |
| 2010/0256428 A1* | 10/2010 | Marker et al. | 585/240 |

(Continued)

FOREIGN PATENT DOCUMENTS

WO 2011096912 A1 8/2011

OTHER PUBLICATIONS

Baker, E., et al., "Catalytic hydrotreating of biomass-derived oils," ACS Symposium Series, No. 376, pp. 228-240; 1988.

(Continued)

*Primary Examiner* — Nina Bhat

(57) ABSTRACT

Methods for deoxygenating a biomass-derived pyrolysis oil are provided. A method for deoxygenating a biomass-derived pyrolysis oil comprising the steps of combining a biomass-derived pyrolysis oil stream with a heated low-oxygen-pyoil diluent recycle stream to form a heated diluted pyoil feed stream is provided. The heated diluted pyoil feed stream has a feed temperature of about 150° C. or greater. The heated diluted pyoil feed stream is contacted with a first deoxygenating catalyst in the presence of hydrogen at first hydroprocessing conditions effective to form a low-oxygen biomass-derived pyrolysis oil effluent.

20 Claims, 1 Drawing Sheet

(56) References Cited

U.S. PATENT DOCUMENTS

| | | |
|---|---|---|
| 2010/0319242 A1 | 12/2010 | Hanks et al. |
| 2011/0047864 A1 | 3/2011 | Bhan et al. |
| 2011/0083997 A1 | 4/2011 | Silva et al. |
| 2011/0094149 A1 | 4/2011 | Weiss et al. |
| 2011/0098494 A1 | 4/2011 | Weiss et al. |
| 2011/0192072 A1 | 8/2011 | Steele et al. |
| 2011/0282116 A1 | 11/2011 | Myllyoja et al. |
| 2012/0017493 A1* | 1/2012 | Traynor et al. .......... 44/388 |
| 2012/0017495 A1* | 1/2012 | Traynor et al. .......... 44/401 |
| 2012/0067773 A1* | 3/2012 | Ditsch .................... 208/51 |

OTHER PUBLICATIONS

Wildschut, J., et al., "Catalyst studies on the hydrotreatment of fast pyrolysis oil," Applied Catalysis B: Environmental, vol. 99, No. 1-2, pp. 298-306; Aug. 31, 2010.

Gilson, Jean-Pierre, "Characterization of HDO catalysts for their rational design," ACS National Meeting Book of Abstracts; Mar. 2011.

* cited by examiner

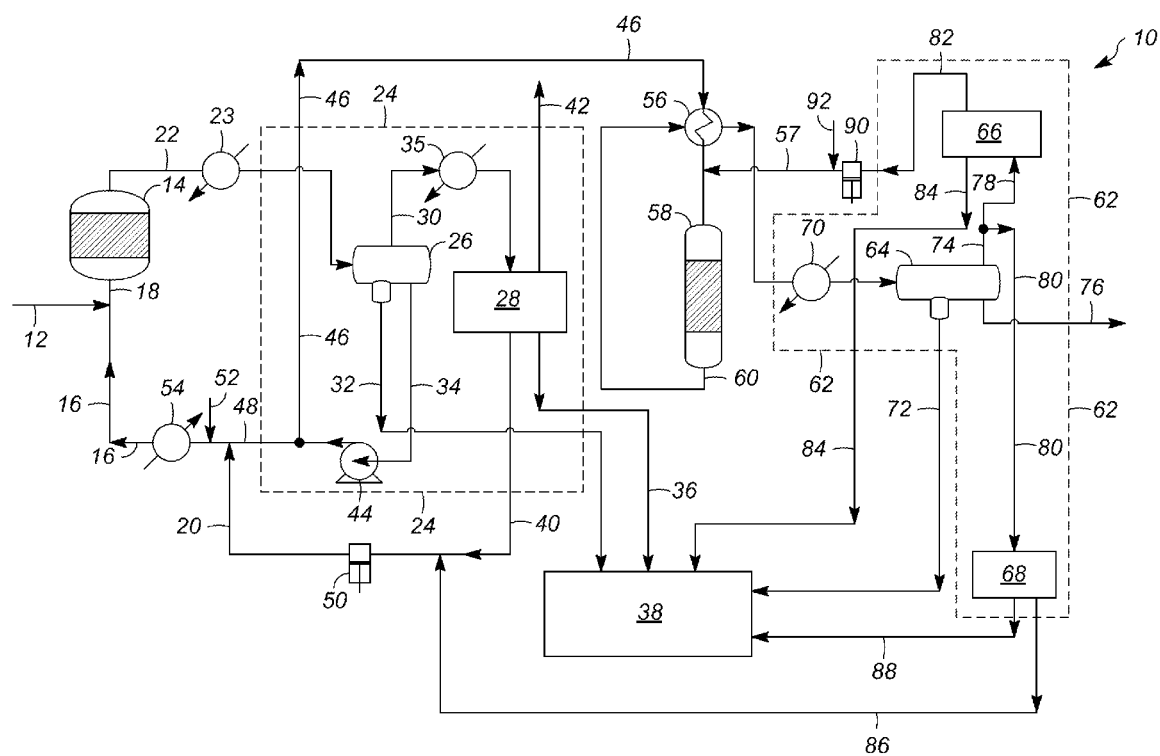

METHODS FOR DEOXYGENATING BIOMASS-DERIVED PYROLYSIS OIL

STATEMENT REGARDING FEDERALLY SPONSORED RESEARCH OR DEVELOPMENT

This invention was made with Government support under DE-EE0002879 awarded by the U.S. Department of Energy. The Government has certain rights in this invention.

TECHNICAL FIELD

The present invention relates generally to methods for producing biofuels, and more particularly to methods for producing low-oxygen biomass-derived pyrolysis oil from the catalytic deoxygenation of biomass-derived pyrolysis oil.

BACKGROUND

Fast pyrolysis is a process during which organic carbonaceous biomass feedstock, i.e., "biomass", such as wood waste, agricultural waste, algae, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil (commonly referred to as "pyoil"). Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which can undergo secondary reactions during storage particularly if the oil is stored at elevated temperatures. "Oxygenated hydrocarbons" or "oxygenates" as used herein are organic compounds containing hydrogen, carbon, and oxygen. Such oxygenated hydrocarbons in the biomass-derived pyrolysis oil include carboxylic acids, phenols, cresols, alcohols, aldehydes, etc. Conventional biomass-derived pyrolysis oil comprises about 30% or greater by weight oxygen from these oxygenated hydrocarbons. Conversion of biomass-derived pyrolysis oil into biofuels and chemicals requires full or partial deoxygenation of the biomass-derived pyrolysis oil. Such deoxygenation may proceed via two main routes, namely the elimination of either water or $CO_2$. Unfortunately, deoxygenating biomass-derived pyrolysis oil leads to rapid plugging or fouling of the processing catalyst in a hydroprocessing reactor caused by the formation of solids from the biomass-derived pyrolysis oil. Components in the pyrolysis oil form on the processing catalysts causing catalytic bed fouling, reducing activity of the catalyst, and causing build up in the hydroprocessing reactor. It is believed that this plugging is due to an acid catalyzed polymerization of the various components of the biomass-derived pyrolysis oil, e.g., second order reactions in which the various components of the oil polymerize with themselves, that create either a glassy brown polymer or powdery brown char that limits run duration and processibility of the biomass-derived pyrolysis oil.

Accordingly, it is desirable to provide methods for producing a low-oxygen biomass-derived pyrolysis oil without plugging of the catalyst, thereby increasing run duration and improving processibility of the biomass-derived pyrolysis oil. Furthermore, other desirable features and characteristics of the present invention will become apparent from the subsequent detailed description and the appended claims, taken in conjunction with the accompanying drawings and this background.

BRIEF SUMMARY

Methods for deoxygenating a biomass-derived pyrolysis oil are provided herein. In accordance with an exemplary embodiment, a method for deoxygenating a biomass-derived pyrolysis oil comprises the steps of combining a biomass-derived pyrolysis oil stream with a heated low-oxygen-pyoil diluent recycle stream to form a heated diluted pyoil feed stream that has a feed temperature of about 150° C. or greater. The heated diluted pyoil feed stream is contacted with a first deoxygenating catalyst in the presence of hydrogen at first hydroprocessing conditions effective to form a low-oxygen biomass-derived pyrolysis oil effluent.

In accordance with another exemplary embodiment, a method for deoxygenating a biomass-derived pyrolysis oil is provided. The method comprises the steps of combining a biomass-derived pyrolysis oil stream that has an initial temperature of about 100° C. or less with a heated low-oxygen-pyoil diluent recycle stream to form a heated diluted pyoil feed stream. The heated diluted pyoil feed stream has a feed temperature of about 150° C. or greater. The heated diluted pyoil feed stream is introduced to a hydroprocessing reactor that contains a deoxygenating catalyst in the presence of hydrogen. The heated diluted pyoil feed stream is contacted with the deoxygenating catalyst at hydroprocessing conditions that include a reaction temperature of about the feed temperature effective to partially deoxygenate the heated diluted pyoil feed stream and form a low-oxygen biomass-derived pyrolysis oil effluent.

In accordance with another exemplary embodiment, a method for deoxygenating a biomass-derived pyrolysis oil is provided. The method comprises the steps of combining a biomass-derived pyrolysis oil stream with a heated low-oxygen-pyoil diluent recycle stream to form a heated diluted pyoil feed stream. The heated diluted pyoil feed stream has a feed temperature of about 150° C. or greater. The biomass-derived pyrolysis oil stream comprises a first organic phase that has a first residual oxygen content of about 10 wt. % or greater of the first organic phase. The heated low-oxygen-pyoil diluent recycle stream comprises a second hydroprocessed organic phase that has a second residual oxygen content of from about 5 to about 25 wt. % of the second hydroprocessed organic phase. The heated diluted pyoil feed stream is introduced to a first hydroprocessing reactor that contains a first deoxygenating catalyst in the presence of hydrogen at first hydroprocessing conditions effective to partially deoxygenate the heated diluted pyoil feed stream. A low-oxygen biomass-derived pyrolysis oil effluent is formed that comprises a third hydroprocessed organic phase that has a third residual oxygen content of from about 5 to about 25 wt. % of the third hydroprocessed organic phase.

BRIEF DESCRIPTION OF THE DRAWINGS

The present invention will hereinafter be described in conjunction with the following drawing figures, wherein like numerals denote like elements, and wherein:

FIG. 1 is a block diagram of an apparatus for deoxygenating a biomass-derived pyrolysis oil in accordance with an exemplary embodiment.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to methods for deoxygenating a biomass-derived pyrolysis oil. Unlike the prior art, the exemplary embodiments taught herein produce a low-oxygen biomass-derived pyrolysis oil effluent by contacting a heated diluted pyoil feed stream with a deoxygenating catalyst in the presence of hydrogen at hydroprocessing conditions to partially deoxygenate the heated diluted pyoil feed stream. It should be appreciated that while the deoxygenated oil produced according to exemplary embodiments of the present invention are generally described herein as a "low-oxygen biomass-derived pyrolysis oil" or an "ultralow-oxygen biomass-derived pyrolysis oil," these terms generally include any pyoil produced having a lower oxygen concentration (i.e. a lower residual oxygen content) than conventional biomass-derived pyrolysis oil. The term "low-oxygen biomass-derived pyrolysis oil" is pyoil having some oxygen, i.e., a biomass-derived pyrolysis oil in which a portion of the oxygenated hydrocarbons have been converted into hydrocarbons (i.e. a "hydrocarbon product"). In an exemplary embodiment, the low-oxygen biomass-derived pyrolysis oil comprises an organic phase (i.e. oil comprising primarily oxygenates and/or hydrocarbons) that comprises oxygen in an amount of from about 5 to about 25 weight percent (wt. %) of the organic phase. The term "ultralow-oxygen biomass-derived pyrolysis oil" is pyoil that has less oxygen than the low-oxygen biomass-derived pyrolysis oil and includes pyoil having substantially no oxygen, i.e., a biomass-derived pyrolysis oil in which substantially all the oxygenated hydrocarbons have been converted into hydrocarbons (i.e., a "hydrocarbon product"). In an exemplary embodiment, the ultralow-oxygen biomass-derived pyrolysis oil comprises an organic phase that comprises oxygen in an amount of from about 0 to about 1 wt. % of the organic phase. A "hydrocarbons" as used herein are organic compounds that contain principally only hydrogen and carbon, i.e., oxygen-free.

The heated diluted pyoil feed stream is formed by combining a biomass-derived pyrolysis oil stream with a heated low-oxygen-pyoil diluent recycle stream. The heated low-oxygen-pyoil diluent recycle stream is formed from a portion of the low-oxygen biomass-derived pyrolysis oil effluent that has been recycled and heated. Therefore, the heated low-oxygen-pyoil diluent recycle stream has already been partially deoxygenated, which removes not only some of the oxygen but also significantly reduces the amount of pyoil reactant components that can form solids by secondary polymerization reactions. As such, the heated low-oxygen-pyoil diluent recycle stream has less pyoil reactant components that can form solids and contains some oxygen but less oxygen than the biomass-derived pyrolysis oil stream. The inventors have found that by having some oxygen in the heated low-oxygen-pyoil diluent recycle stream, the biomass-derived pyrolysis oil stream is mutually miscible with the heated low-oxygen-pyoil diluent recycle stream.

In an exemplary embodiment, the biomass-derived pyrolysis oil stream has an initial temperature of about 100° C. or less, for example of about ambient, prior to being combined with the heated low-oxygen-pyoil diluent recycle stream to minimize formation of solids caused by secondary polymerization reactions in the pyoil before hydroprocessing, such as during storage. In an exemplary embodiment, the heated low-oxygen-pyoil diluent recycle stream has a recycle temperature of about 200 to about 450° C. By combining the biomass-derived pyrolysis oil stream with the heated low-oxygen-pyoil diluent recycle stream, the biomass-derived pyrolysis oil stream is diluted by the heated low-oxygen-pyoil diluent recycle stream and is rapidly heated, for example, to a temperature that is suitable for hydroprocessing. Moreover, diluting the biomass-derived pyrolysis oil stream with the mutually miscible heated diluent facilitates solubilizing any solids that may have formed during storage or that could otherwise form in the pyoil during subsequent hydroprocessing (e.g. glassy brown polymers or powdery brown char).

In an exemplary embodiment, the heated diluted pyoil feed stream is formed upstream from a hydroprocessing reactor that contains the deoxygenating catalyst in the presence of hydrogen and that is operating at hydroprocessing conditions. The heated diluted pyoil feed stream is introduced to the hydroprocessing reactor and contacts the deoxygenating catalyst to form the low-oxygen biomass-derived pyrolysis oil effluent. The inventors have found that by contacting the deoxygenating catalyst with the heated diluted pyoil feed stream in the presence of hydrogen at the hydroprocessing conditions, the amount of glassy brown polymer or powdery brown char formed on the deoxygenating catalyst is substantially reduced or minimized relative to conventional methods. Without being limited by theory, it is believed that by diluting the biomass-derived pyrolysis oil with the heated low-oxygen-pyoil diluent recycle stream, simple reactions of the biomass-derived pyrolysis oil with hydrogen to form a lower-oxygen biomass-derived pyrolysis oil are effectively increased and dominate while secondary polymerization reactions of biomass-derived pyrolysis oil components with themselves are reduced or minimized, thereby reducing or minimizing the formation of glassy brown polymers or powdery brown char on the deoxygenating catalyst. Therefore, a low-oxygen biomass-derived pyrolysis oil can be produced in the hydroprocessing reactor without plugging the deoxygenating catalyst, thereby increasing run duration and improving processability of the biomass-derived pyrolysis oil.

Referring to FIG. 1, a schematic depiction of an apparatus 10 for deoxygenating a biomass-derived pyrolysis oil in accordance with an exemplary embodiment is provided. As illustrated, a biomass-derived pyrolysis oil stream 12 comprising the biomass-derived pyrolysis oil is introduced to the apparatus 10. The biomass-derived pyrolysis oil may be produced, such as, for example, from pyrolysis of biomass in a pyrolysis reactor. Virtually any form of biomass can be used for pyrolysis to produce the biomass-derived pyrolysis oil. The biomass-derived pyrolysis oil may be derived from biomass material, such as, wood, agricultural waste, nuts and seeds, algae, forestry residues, and the like. The biomass-derived pyrolysis oil may be obtained by different modes of pyrolysis, such as, for example, fast pyrolysis, vacuum pyrolysis, catalytic pyrolysis, and slow pyrolysis or carbonization, and the like.

The composition of the biomass-derived pyrolysis oil can vary considerably and depends on the feedstock and processing variables. Examples of biomass-derived pyrolysis oil "as-produced" can contain up to about 1,000 to about 2,000 ppm total metals, about 20 to about 33 weight percent (wt. %) of water that can have high acidity (e.g. total acid number (TAN) >150), and a solids content of from about 0.1 wt. % to about 5 wt. %. The biomass-derived pyrolysis oil may be untreated (e.g. "as produced"). However, if needed the biomass-derived pyrolysis oil can be selectively treated to reduce any or all of the above to a desired level. In an exemplary embodiment, the biomass-derived pyrolysis oil comprises an organic phase (i.e. oil comprising primarily oxygenates and/or hydrocarbons) that has a residual oxygen content of about 10 wt. % or greater, for example of about 30 wt. % or greater, for example from about 30 to about 50 wt. %, such as from about 35 to about 45 wt. % of the organic phase.

The biomass-derived pyrolysis oil can be thermally unstable and may be stored and/or handled so as to reduce its exposure to higher temperatures, minimizing any secondary polymerization reactions of the various components in the biomass-derived pyrolysis oil with themselves prior to hydroprocessing. In an exemplary embodiment, the biomass-derived pyrolysis oil stream 12 has as an initial temperature (e.g. storage temperature) of about 100° C. or less, for example from about 15 to about 100° C., for example from about 15 to about 50° C., such as about ambient, to minimize secondary polymerization reactions.

Upstream from a first hydroprocessing reactor 14, the biomass-derived pyrolysis oil stream 12 is combined and diluted with a heated low-oxygen-pyoil diluent recycle stream 16 to form a heated diluted pyoil feed stream 18. The heated low-oxygen-pyoil diluent recycle stream 16 can be introduced to the biomass-derived pyrolysis oil stream 12 in a single stream together with a hydrogen-containing gas stream 20, as illustrated and discussed in further detail below, or alternatively, the heated low-oxygen-pyoil diluent recycle stream 16 can be introduced to the biomass-derived pyrolysis oil stream 12 in a single or in multiple separate streams that do not include the hydrogen-containing gas stream 20. For example, the hydrogen-containing gas stream 20 can be introduced directly to the heated diluted pyoil feed stream 18 and/or directly to the first hydroprocessing reactor 14, and the heated low-oxygen-pyoil diluent recycle stream 16 can be introduced to the biomass-derived pyrolysis oil stream 12 absent the hydrogen-containing gas stream 20.

As will be discussed in further detail below, the heated low-oxygen-pyoil diluent recycle stream 16 is a pyoil stream that has been previously partially deoxygenated, recycled, and heated. As such, the heated low-oxygen-pyoil diluent recycle stream 16 has less pyoil reactant components that can form solids by secondary polymerization reactions, and contains some oxygen but less oxygen than the biomass-derived pyrolysis oil stream 12. By having some oxygen in the heated low-oxygen-pyoil diluent recycle stream 16, the biomass-derived pyrolysis oil stream 12 and the heated low-oxygen-pyoil diluent recycle stream 16 are mutually miscible. In an exemplary embodiment, the heated low-oxygen-pyoil diluent recycle stream 16 comprises a hydroprocessed organic phase that has a residual oxygen content of from about 5 to about 25 wt. %, for example from about 5 to about 15 wt. %, such as from about 10 to about 15 wt. % of the hydroprocessed organic phase. In one example, the hydroprocessed organic phase comprises oxygenates such as phenols, alkyl phenols, alcohols, ethers, and/or the like that are similar to and/or easily solubilized by the oxygenates contained in the biomass-derived pyrolysis oil stream 12.

In an exemplary embodiment, the heated low-oxygen-pyoil diluent recycle stream 16 has a temperature of from about 200 to about 450° C., for example from about 300 to about 450° C., such as from about 325 to about 425° C. In an exemplary embodiment, the biomass-derived pyrolysis oil stream 12 and the heated low-oxygen-pyoil diluent recycle stream 16 are combined at a predetermined recycle ratio that is defined by a mass flow rate of the heated low-oxygen-pyoil diluent recycle stream 16 to a mass flow rate of the biomass-derived pyrolysis oil stream 12 to form the heated diluted pyoil feed stream 18 that has a feed temperature of about 150° C. or greater, for example from about 150 to about 400° C., such as from about 300 to about 375° C. In an exemplary embodiment, the biomass-derived pyrolysis oil stream 12 is combined with the heated low-oxygen-pyoil diluent recycle stream 16 at the predetermined recycle ratio of from about 1:1 to about 10:1.

The heated diluted pyoil feed stream 18 is introduced to the first hydroprocessing reactor 14. The first hydroprocessing reactor 14 can be a continuous flow reactor, such as a fixed-bed reactor, a continuous stirred tank reactor (CSTR), a trickle bed reactor, an ebulliating bed reactor, a slurry reactor, or any other reactor known to those skilled in the art for hydroprocessing.

The first hydroprocessing reactor 14 contains a deoxygenating catalyst in the presence of hydrogen. In an exemplary embodiment, the deoxygenating catalyst comprises a metal or a combination of metals, such as a base metal(s), a refractory metal(s), and/or a noble metal(s), such as platinum, palladium, ruthenium, nickel, molybdenum, tungsten, and/or cobalt. The metal(s) may be on a support, such as a carbon support, a silica support, an alumina support, a silica-alumina support, a gamma alumina support, and/or a titanium support. Other hydroprocessing catalysts known to those skilled in the art may also be used.

The first hydroprocessing reactor 14 is operating at hydroprocessing conditions. In an exemplary embodiment, the hydroprocessing conditions include a reactor temperature of from about 150 to about 400° C., such as from about 300 to about 375° C., a reactor pressure of from about 2 to about 20 MPa gauge, a liquid hourly space velocity on a basis of volume of the biomass-derived pyrolysis oil/volume of catalyst/hour ($hr^{-1}$) of from about 0.5 to about 1 $hr^{-1}$, and a hydrogen-containing gas treat rate of from about 1,000 to about 15,000 standard cubic feet per barrel (SCF/B).

In an exemplary embodiment, the heated diluted pyoil feed stream 18 is formed just upstream of the first hydroprocessing reactor 14 and the feed temperature of the heated diluted pyoil feed stream 18 is at about the reactor temperature to facilitate rapid catalytic deoxygenation of the heated diluted pyoil feed stream 18 with a short or minimal residence time. The term "residence time" as used herein is the amount of time from when the biomass-derived pyrolysis oil stream 12 is combined with the heated low-oxygen-pyoil diluent recycle stream 16 to when the heated diluted pyoil feed stream 18 initially contacts the deoxygenating catalyst. By having a relatively short residence time, less solids can form in the heated diluted pyoil feed stream 18 at elevated temperatures by secondary polymerization reactions before hydroprocessing begins. In an exemplary embodiment, the residence time is about 60 seconds or less, for example about 20 seconds or less, for example about 10 second or less, such as from about 10 to about 1 seconds.

The heated diluted pyoil feed stream 18 contacts the deoxygenating catalyst at the hydroprocessing conditions in the presence of hydrogen and forms a low-oxygen biomass-derived pyrolysis oil effluent 22 by converting a portion of the oxygenated hydrocarbons in the biomass-derived pyrolysis oil into hydrocarbons (i.e. partial deoxygenation). In particular, hydrogen from the hydrogen-containing gas stream 20 removes oxygen from the biomass-derived pyrolysis oil as water to produce the low-oxygen biomass-derived pyrolysis oil effluent 22 that comprises an aqueous phase and a hydroprocessed organic phase. The hydroprocessed organic phase comprises oil that is partially deoxygenated with some residual oxygenated hydrocarbons. In an exemplary embodiment, the hydroprocessed organic phase of the low-oxygen biomass-derived pyrolysis oil effluent 22 has a residual oxygen content of from about 5 to about 25 wt. %, for example from about 5 to about 15 wt. %, such as from about 10 to about 15 wt. % of the hydroprocessed organic phase.

It is believed that the benefits of catalytically deoxygenating the biomass-derived pyrolysis oil that is diluted with the heated low-oxygen-pyoil diluent recycle stream 16, may result in increasing hydrogen solubility, immolating the exotherm by dilution of the reactive species in the biomass-derived pyrolysis oil, and reducing the reaction rate of bimolecular reactants that lead to secondary polymerization reactions. As such, simple reactions of the biomass-derived pyrolysis oil with hydrogen to form a lower-oxygen biomass-derived pyrolysis oil dominate while secondary polymerization reactions of biomass-derived pyrolysis oil components with themselves are reduced or minimized, thereby reducing or minimizing the formation of glassy brown polymers or powdery brown char on the deoxygenating catalyst.

In an exemplary embodiment, the low-oxygen biomass-derived pyrolysis oil effluent 22 is removed from the first hydroprocessing reactor 14 and is passed through a chiller 23 to a first separation zone 24. In an exemplary embodiment, the chiller 23 cools the low-oxygen biomass-derived pyrolysis oil effluent 22 to a temperature of from about 30 to about 60° C. The first separation zone 24 removes light volatiles, water, solids, and light liquids from the low-oxygen biomass-derived pyrolysis oil effluent 22 using one or more separation vessels, fractionation columns, heaters, condensers exchangers, pipes, pumps, compressors, controllers, and/or the like. In an exemplary embodiment and as illustrated, the first separation zone 24 comprises a three-phase separator 26 and an aqueous-hydrogen gas separation and purification zone 28. The low-oxygen biomass-derived pyrolysis oil effluent 22 is introduced to the three-phase separator 26 and is separated into a water-$H_2$ gas containing stream 30, a solids-containing stream 32, and a water-depleted low-oxygen-pyoil stream 34.

The water-$H_2$ gas containing stream 30 is passed through a condenser 35 and introduced to the aqueous-hydrogen gas separation and purification zone 28. In an exemplary embodiment, the condenser 35 cools the water-$H_2$ gas containing stream 30 to a temperature of from about 30 to about 60° C. The aqueous-hydrogen gas separation and purification zone 28 separates the water-$H_2$ gas containing stream 30 into an aqueous stream 36, a hydrogen-containing recycle gas stream 40, and a light volatiles stream 42. The aqueous stream 36 is passed along to an aqueous-solids-catalyst recovery zone 38 and the light volatiles stream 42 is removed from the apparatus 10. The solids-containing stream 32 comprises solids that may have formed prior to or during hydroprocessing, e.g., glassy brown polymers or powdery brown char, and possibly some spent deoxygenating catalyst that may have been removed from the first hydroprocessing reactor 14 with the effluent 22. The solids-containing stream 32 is passed along to an aqueous-solids-catalyst recovery zone 38.

The water-depleted low-oxygen-pyoil stream 34 is passed through a pump 44 and is divided into a water-depleted low-oxygen-pyoil intermediate stream 46 and a water-depleted low-oxygen-pyoil recycle stream 48. The hydrogen-containing recycle gas stream 40 is passed through a compressor 50 and is optionally introduced to the water-depleted low-oxygen-pyoil recycle stream 48, or alternatively and as discussed above, is introduced directly to the heated low-oxygen-pyoil diluent recycle stream 16, the heated diluted pyoil feed stream 18, and/or the first hydroprocessing reactor 14. In an exemplary embodiment, the compressor 50 compresses the hydrogen-containing recycle gas stream 40 to a pressure that is sufficient for introducing the hydrogen-containing recycle gas stream 40 to the water-depleted low-oxygen-pyoil recycle stream 48 without any substantial backflow of the of the recycle streams 40 and/or 48. Optionally, fresh makeup deoxygenating catalyst 52 is introduced to the water-depleted low-oxygen pyoil recycle stream 48 to replenish any deoxygenating catalyst that may have been removed from the first hydroprocessing reactor 14. The water-depleted low-oxygen pyoil recycle stream 48 is then passed through a heater 54 to form the heated low-oxygen-pyoil diluent recycle stream 16. In an exemplary embodiment and as discussed above, the heater 54 heats the water-depleted low-oxygen pyoil recycle stream 48 to a temperature of from about 200 to about 450° C.

The water-depleted low-oxygen pyoil intermediate stream 46 may be removed from the apparatus 10 and used, for example, as a fuel product, or alternatively and as illustrated, may be passed along for an additional hydroprocessing to further lower its oxygen content. As shown, the water-depleted low-oxygen pyoil intermediate stream 46 is passed through a heat exchanger 56, combined with a hydrogen-containing gas stream 57, and is introduced to a second hydroprocessing reactor 58. In an exemplary embodiment, the heat exchanger 56 heats the water-depleted low-oxygen pyoil intermediate stream 46 to a temperature of about 150 to about 400° C.

The second hydroprocessing reactor 58 can be, for example, a batch reactor or continuous flow reactor, such as a fixed-bed reactor, a continuous stirred tank reactor (CSTR), a trickle bed reactor, an ebulliating bed reactor, a slurry reactor, or any other reactor known to those skilled in the art for hydroprocessing. The second hydroprocessing reactor 58 contains a deoxygenating catalyst in the presence of hydrogen as discussed above with respect to the deoxygenating catalyst in the first hydroprocessing reactor 14. The second hydroprocessing reactor 58 is operating at hydroprocessing conditions. In an exemplary embodiment, the hydroprocessing conditions include a reactor temperature of from about 150 to about 400° C., such as from about 300 to about 375° C., a reactor pressure of from about 2 to about 20 MPa gauge, a liquid hourly space velocity on a basis of volume of the biomass-derived pyrolysis oil/volume of catalyst/hour ($hr^{-1}$) of from about 0.5 to about 1 $hr^{-1}$, and a hydrogen-containing gas treat rate of from about 1,000 to about 15,000 standard cubic feet per barrel (SCF/B). The deoxygenating catalyst in the second hydroprocessing reactor 58 can be the same as or different from the deoxygenating catalyst and the first hydroprocessing reactor 14.

In an exemplary embodiment, the water-depleted low-oxygen pyoil intermediate stream 46 contacts the deoxygenating catalyst at the hydroprocessing conditions in the presence of hydrogen to form an ultralow-oxygen biomass-derived pyrolysis oil effluent 60 by converting at least a portion of the oxygenated hydrocarbons in the low-oxygen biomass-derived pyrolysis oil into hydrocarbons. In particular, hydrogen from the hydrogen-containing gas stream 57 removes oxygen from the low-oxygen biomass-derived pyrolysis oil as water to produce the ultralow-oxygen biomass-derived pyrolysis oil effluent 60. The oil contained in the ultralow-oxygen biomass-derived pyrolysis oil effluent 60 may be partially deoxygenated with some residual oxygenated hydrocarbons, or may be substantially fully deoxygenated where substantially all of the oxygenated hydrocarbons are converted into hydrocarbons. In an exemplary embodiment, the ultralow-oxygen biomass-derived pyrolysis oil effluent 60 comprises a hydroprocessed organic phase that has a residual oxygen content of about 1 wt. % or less, for example from about 1 to about 0 wt. %, such as about 0.1 to about 0 wt. % of the hydroprocessed organic phase.

The ultralow-oxygen biomass-derived pyrolysis oil effluent 60 is passed through the heat exchanger 56 to transfer heat to the water-depleted low-oxygen-pyoil intermediate stream 46 and is introduced to a second separation zone 62. The second separation zone 62 removes light volatiles, water, solids, and light liquids from the ultralow-oxygen biomass-derived pyrolysis oil effluent 60 using one or more separation vessels, fractionation columns, heaters, condensers exchangers, pipes, pumps, compressors, controllers, and/or the like.

In an exemplary embodiment and as illustrated, the second separation zone 62 comprises a three-phase separator 64, and first and second hydrogen gas separation and purification zones 66 and 68. The ultralow-oxygen biomass-derived pyrolysis oil effluent 60 is passed through a condenser 70 and is introduced to the three-phase separator 64. In an exemplary embodiment, the condenser 70 cools the ultralow-oxygen biomass-derived pyrolysis oil effluent 60 to a temperature of from about 30 to about 60° C. The three-phase separator 64 separates the ultralow-oxygen biomass-derived pyrolysis oil effluent 60 into a water-containing stream 72, a hydrogen-contaminant containing gas stream 74, and a hydrocarbon product stream 76 that may be passed along for further processing and/or to be used as a fuel product. The water-containing stream 72 is passed along to the aqueous-solids-catalyst recovery zone 38. The hydrogen-contaminant containing gas stream 74 is divided into a first portion 78 that is introduced to the first hydrogen gas separation and purification zone 66 and a second portion 80 that is introduced to the second hydrogen gas separation and purification zone 68. The first hydrogen gas separation and purification zone 66 separates the first portion 78 of the hydrogen-contaminant containing gas stream 74 into a hydrogen-containing recycle gas stream 82 and a contaminant-containing stream 84 that is passed along to the aqueous-solids-catalyst recovery zone 38. The second gas separation and purification zone 68 separates the second portion 80 of the hydrogen-contaminant containing gas stream 74 into a hydrogen-containing recycle gas stream 86 that is combined with the hydrogen-containing recycle gas stream 40 and a contaminant-containing stream 88 that is passed along to the aqueous-solids-catalyst recovery zone 38.

The hydrogen-containing recycle gas stream 82 is passed through a compressor 90 and combined with a fresh hydrogen-containing gas stream 92 to form the hydrogen-containing gas stream 57. In an exemplary embodiment, the compressor 90 compresses the hydrogen-containing recycle gas stream 82 to a pressure that is sufficient for introducing the hydrogen-containing gas stream 57 into the water-depleted low-oxygen-pyoil intermediate stream 46 upstream from the second hydroprocessing reactor 58 without any substantial backflow.

Accordingly, methods for deoxygenating a biomass-derived pyrolysis oil have been described. Unlike the prior art, the exemplary embodiments taught herein produce a low-oxygen biomass-derived pyrolysis oil effluent by contacting a heated diluted pyoil feed stream with a deoxygenating catalyst in the presence of hydrogen at hydroprocessing conditions. In particular, the heated diluted pyoil feed stream is formed by combining a biomass-derived pyrolysis oil stream with a heated low-oxygen-pyoil diluent recycle stream. The heated low-oxygen-pyoil diluent recycle stream is formed from a portion of the low-oxygen biomass-derived pyrolysis oil effluent that has been recycled and heated. The heated diluted pyoil feed stream is introduced to a hydroprocessing reactor and contacts the deoxygenating catalyst to partially deoxygenate the heated diluted pyoil feed stream to form the low-oxygen biomass-derived pyrolysis oil effluent. By contacting the deoxygenating catalyst with the heated diluted pyoil feed stream in the presence of hydrogen at the hydroprocessing conditions, the amount of glassy brown polymer or powdery brown char formed on the deoxygenating catalyst is substantially reduced or minimized relative to conventional methods. Therefore, a low-oxygen biomass-derived pyrolysis oil can be produced in the hydroprocessing reactor without plugging the deoxygenating catalyst, thereby increasing run duration and improving processability of the biomass-derived pyrolysis oil.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for deoxygenating a biomass-derived pyrolysis oil, the method comprising the steps of:
    combining a biomass-derived pyrolysis oil stream with a heated low-oxygen-pyoil diluent recycle stream to form a heated diluted pyoil feed stream that has a feed temperature of about 150° C. or greater; and
    contacting the heated diluted pyoil feed stream with a first deoxygenating catalyst in the presence of hydrogen at first hydroprocessing conditions effective to form a low-oxygen biomass-derived pyrolysis oil effluent.

2. The method of claim 1, wherein the step of contacting comprises contacting the heated diluted pyoil feed stream with the first deoxygenating catalyst at the first hydroprocessing conditions that include a reaction temperature of about the feed temperature.

3. The method of claim 1, wherein the step of contacting comprises contacting the heated diluted pyoil feed stream with the first deoxygenating catalyst at the first hydroprocessing conditions that include a reaction temperature of from about 150 to about 400° C.

4. The method of claim 1, wherein the step of combining comprises forming the heated diluted pyoil feed stream at the feed temperature of from about 150 to about 400° C.

5. The method of claim 1, wherein the step of combining comprises introducing the heated low-oxygen-pyoil diluent recycle stream to the biomass-derived pyrolysis oil stream that has a temperature of from about 15 to about 100° C.

6. The method of claim 1, wherein the step of combining comprises introducing the heated low-oxygen-pyoil diluent recycle stream that has a temperature of from about 200 to about 450° C. to the biomass-derived pyrolysis oil stream.

7. The method of claim 1, wherein the step of combining comprises combining the biomass-derived pyrolysis oil stream with the heated low-oxygen-pyoil diluent recycle stream at a predetermined recycle ratio of from about 1:1 to about 10:1, wherein the predetermined recycle ratio is defined by a recycle mass flow rate of the heated low-oxygen-pyoil diluent recycle stream to a pyoil mass flow rate of the biomass-derived pyrolysis oil stream.

8. The method of claim 1, wherein the step of contacting comprises contacting the first deoxygenating catalyst with the heated diluted pyoil feed stream at the first hydroprocessing conditions that include a reactor pressure of from about 2 to about 20 MPa gauge.

9. The method of claim 1, wherein the step of contacting comprises contacting the first deoxygenating catalyst with the heated diluted pyoil feed stream at the first hydroprocessing conditions that include a liquid hourly space velocity on a basis of volume of the biomass-derived pyrolysis oil stream per volume of catalyst of from about 0.5 to about 1 hr$^{-1}$.

10. The method of claim 1, wherein the step of contacting comprises partially deoxygenating the heated diluted pyoil feed stream to form the low-oxygen biomass-derived pyrolysis oil effluent that comprises a hydroprocessed organic phase that has a residual oxygen content of from about 5 to about 25 wt. % of the hydroprocessed organic phase.

11. The method of claim 1, wherein the step of contacting comprises partially deoxygenating the heated diluted pyoil feed stream to form the low-oxygen biomass-derived pyrolysis oil effluent that comprises a hydroprocessed organic phase that has a residual oxygen content of from about 5 to about 15 wt. % of the hydroprocessed organic phase.

12. The method of claim 1, wherein the step of contacting comprises contacting the heated diluted pyoil feed stream with the first deoxygenating catalyst by a residence time of about 60 seconds or less, wherein the residence time is defined by a time from when the biomass-derived pyrolysis oil stream is combined with the heated low-oxygen-pyoil diluent recycle stream to when the heated diluted pyoil feed stream initially contacts the first deoxygenating catalyst.

13. The method of claim 1, further comprising the steps of:
removing water from and separating the low-oxygen biomass-derived pyrolysis oil effluent to form a water-depleted low-oxygen-pyoil recycle stream; and
advancing and heating the water-depleted low-oxygen-pyoil recycle stream to replenish the heated low-oxygen-pyoil diluent recycle stream.

14. The method of claim 1, further comprising the steps of:
removing water from and separating the low-oxygen biomass-derived pyrolysis oil effluent to form a water-depleted low-oxygen-pyoil intermediate stream; and
contacting the water-depleted low-oxygen-pyoil intermediate stream with a second deoxygenating catalyst in the presence of hydrogen at second hydroprocessing conditions effective to form an ultralow-oxygen biomass-derived pyrolysis oil effluent.

15. The method of claim 14, wherein the step of contacting the water-depleted low-oxygen-pyoil intermediate stream comprises forming the ultralow-oxygen biomass-derived pyrolysis oil effluent that comprises a second hydroprocessed organic phase that has a residual oxygen content of about 1 wt. % or less of the second hydroprocessed organic phase.

16. A method for deoxygenating a biomass-derived pyrolysis oil, the method comprising the steps of:
combining a biomass-derived pyrolysis oil stream that has an initial temperature of about 100° C. or less with a heated low-oxygen-pyoil diluent recycle stream to form a heated diluted pyoil feed stream that has a feed temperature of about 150° C. or greater; and
introducing the heated diluted pyoil feed stream to a hydroprocessing reactor that contains a deoxygenating catalyst in the presence of hydrogen including contacting the heated diluted pyoil feed stream with the deoxygenating catalyst at hydroprocessing conditions that include a reaction temperature of about the feed temperature effective to partially deoxygenate the heated diluted pyoil feed stream and form a low-oxygen biomass-derived pyrolysis oil effluent.

17. The method of claim 16, wherein the step of introducing comprises contacting the heated diluted pyoil feed stream with the deoxygenating catalyst by a residence time of about 60 seconds or less, wherein the residence time is defined by a time from when the biomass-derived pyrolysis oil stream is combined with the heated low-oxygen-pyoil diluent recycle stream to when the heated diluted pyoil feed stream initially contacts the deoxygenating catalyst.

18. The method of claim 16, further comprising the steps of:
introducing the low-oxygen biomass-derived pyrolysis oil effluent to a separation zone to remove water from and separate the low-oxygen biomass-derived pyrolysis oil effluent to form a water-depleted low-oxygen-pyoil recycle stream; and
advancing the water-depleted low-oxygen-pyoil recycle stream through a heater to heat the water-depleted low-oxygen-pyoil recycle stream to a recycle temperature of from about 200 to about 450° C. to replenish the heated low-oxygen-pyoil diluent recycle stream.

19. A method for deoxygenating a biomass-derived pyrolysis oil, the method comprising the steps of:
combining a biomass-derived pyrolysis oil stream with a heated low-oxygen-pyoil diluent recycle stream to form a heated diluted pyoil feed stream that has a feed temperature of about 150° C. or greater, wherein the biomass-derived pyrolysis oil stream comprises a first organic phase that has a first residual oxygen content of about 10 wt. % or greater of the first organic phase, and wherein the heated low-oxygen-pyoil diluent recycle stream comprises a second hydroprocessed organic phase that has a second residual oxygen content of from about 5 to about 25 wt. % of the second hydroprocessed organic phase; and
introducing the heated diluted pyoil feed stream to a first hydroprocessing reactor that contains a first deoxygenating catalyst in the presence of hydrogen at first hydroprocessing conditions effective to partially deoxygenate the heated diluted pyoil feed stream and form a low-oxygen biomass-derived pyrolysis oil effluent that comprises a third hydroprocessed organic phase that has a third residual oxygen content of from about 5 to about 25 wt. % of the third hydroprocessed organic phase.

20. The method of claim 19, further comprising the steps of:
removing water from and separating the low-oxygen biomass-derived pyrolysis oil effluent to form a water-depleted low-oxygen-pyoil intermediate stream; and
introducing the water-depleted low-oxygen-pyoil intermediate stream to a second hydroprocessing reactor that contains a second deoxygenating catalyst in the presence of hydrogen at second hydroprocessing conditions effective to deoxygenate the water-depleted low-oxygen-pyoil intermediate stream and form an ultralow-oxygen biomass-derived pyrolysis oil effluent that comprises a fourth hydroprocessed organic phase that has a fourth residual oxygen content of about 1 wt. % or less of the fourth hydroprocessed organic phase.

* * * * *